US011987854B2

(12) United States Patent
Cingolani

(10) Patent No.: US 11,987,854 B2
(45) Date of Patent: May 21, 2024

(54) MANUFACTURING PROCESS OF THREE-DIMENSIONAL LEATHER OBJECTS

(71) Applicant: EGAS CONSULTING SOCIETA' A RESPONSABILITA' LIMITATA SEMPLIFICATA, Castelfidardo (IT)

(72) Inventor: Corrado Luigi Cingolani, Castelfidardo (IT)

( * ) Notice: Subject to any disclaimer, the term of this patent is extended or adjusted under 35 U.S.C. 154(b) by 332 days.

(21) Appl. No.: 17/599,957

(22) PCT Filed: Apr. 6, 2020

(86) PCT No.: PCT/EP2020/059785
§ 371 (c)(1),
(2) Date: Sep. 29, 2021

(87) PCT Pub. No.: WO2020/207977
PCT Pub. Date: Oct. 15, 2020

(65) Prior Publication Data

US 2022/0170121 A1 Jun. 2, 2022

(30) Foreign Application Priority Data

Apr. 8, 2019 (IT) ........................ 102019000005366

(51) Int. Cl.

| | |
|---|---|
| ***C14B 1/30*** | (2006.01) |
| ***B68F 1/00*** | (2006.01) |
| ***C14B 1/44*** | (2006.01) |
| ***C14B 1/58*** | (2006.01) |
| ***C14C 11/00*** | (2006.01) |

(52) U.S. Cl.
CPC .................. *C14B 1/30* (2013.01); *B68F 1/00* (2013.01); *C14B 1/44* (2013.01); *C14B 1/58* (2013.01); *C14C 11/00* (2013.01)

(58) Field of Classification Search
None
See application file for complete search history.

(56) References Cited

FOREIGN PATENT DOCUMENTS

| | | | |
|---|---|---|---|
| DE | 102004033662 | B3 | 2/2006 |
| EP | 3348653 | A1 | 7/2018 |
| FR | 2933894 | A1 | 1/2010 |
| JP | 2001259264 | A | 9/2001 |

OTHER PUBLICATIONS

International Search Report for corresponding PCT/EP2020/059785, dated Aug. 3, 2020.
Written Opinion of the International Searching Authority for corresponding PCT/EP2020/059785, dated Aug. 3, 2020.

*Primary Examiner* — Jacob T Minskey
*Assistant Examiner* — Adrianna N Konves
(74) *Attorney, Agent, or Firm* — Egbert, McDaniel & Swartz, PLLC

(57) ABSTRACT

A manufacturing process of three-dimensional leather objects, including the following steps: applying a hardener additive on the flesh side of a piece of leather, positioning the flesh side of the piece of leather on a shape, introducing the shape with the piece of leather in a vacuum sack, applying rough vacuum in the vacuum sack, heating the vacuum sack with the shape and the piece of leather, and progressively applying vacuum during the heating step, stopping the vacuum pressure and cooling the vacuum sack with the shape and the piece of leather, opening the sack and extracting the shape with the piece of leather from the vacuum sack and removing the piece of leather from the shape in such a way that the piece of leather has the shape of a three-dimensional object.

11 Claims, 5 Drawing Sheets

MANUFACTURING PROCESS OF THREE-DIMENSIONAL LEATHER OBJECTS

The present invention relates to a manufacturing process of three-dimensional leather objects.

A three-dimensional leather object is obtained by performing a pre-forming operation on the leather in order to shape the leather with a permanent three-dimensional geometry, without using a fixed rigid support.

Such a pre-forming process can be used to create leather objects with an autonomous three-dimensional shape, and also to create semi-finished items used for coating three-dimensional objects, giving the semi-finished item the shape that it will have after being fixed to the structure to be coated.

Automated coating processes that use different types of materials other than leather are currently known. However, automated processes are rarely used for leather coating. In fact, generally speaking, automated leather coating processes are only used for linear geometries and simple shapes because of the difficulties encountered in forming complex leather shapes.

Leather pre-forming operations based on forming processes have been proposed and experimented in the prior art. However, the forming processes are expensive and suitable only for mass productions. Moreover, these forming processes are impaired by a considerable limitation of the geometries and finishes of the leather objects.

FIG. 1 is a diagrammatic view of a forming process of a leather coating according to the prior art.

In step 1, a piece of leather (101) with a flesh side (101*a*) and a grain side (101*b*) is provided. The grain side (101*b*) has a surface grain and/or pattern.

The piece of leather (101) is pre-treated with steam and/or starch to increase the elasticity, the malleability and the maintenance of the impressed form, and is disposed in a heated mold that comprises a male half-mold (A) and a female half-mold (B). The heated metal surfaces of the half-molds (A, B) and the pressure exerted on the piece of leather (101) tend to stretch the leather, eliminating the grain and/or surface print on the grain side (101*b*) of the leather. When the process is finished, the piece of leather (101) maintains its the shape, but loses its softness almost completely.

In step 2, a supporting structure (100) composed of thermo-formable and/or injectable material is formed in a heated mold that comprises a male half-mold (C) and a female half-mold (D), in such a way to obtain the desired shape.

In step 3, the piece of leather (101) and the supporting structure (100) are coupled by means of an adhesion element (102) as adhesive, polyurethane (PU) foam, resins, water or solvent-based adhesive and the like. Such a coupling is performed with a heated mold provided with a male half-mold (E) and a female half-mold (F).

The male half-mold (E) that operates on the grain side (101*b*) of the piece of leather is provided with a pattern of the grain and/or surface pattern of the leather, in such a way to restore the original grain and/or surface pattern or create a specific pattern.

In this way a three-dimensional leather object (103) is obtained. However, in spite of being technically and technologically appreciated in terms of repeatability, precision and speed of execution, the final result is impaired by the fact that leather loses the softness and tactile perception that are typical of leather objects that are not hot-formed. Moreover, the molds for such a process are very expensive and are only feasible for productions of more than 50,000-100,000 pieces.

DE102004033662 discloses a process to form leather products.

The purpose of the present invention is to eliminate the drawbacks of the prior art by disclosing a manufacturing process of three-dimensional leather objects that does not alter the sensory perception of the leather.

Another purpose is to disclose such a manufacturing process of three-dimensional leather objects that is efficient, effective, reliable, versatile, practical, inexpensive and easy to make.

These purposes are achieved according to the invention with the characteristics of the independent claim 1.

Advantageous embodiments of the invention appear from the dependent claims.

The purpose of the applicant is to create three-dimensional leather objects to obtain leather objects with a specific shape that is maintained over time and to facilitate the application process of said three-dimensional leather objects on structures that are to be coated such as logos, trademarks, lasts and accessories for shoes, patterns and geometric shapes, car parts, leather components, accessories, cases or boxes in general.

The main technical problem is represented by the fact that leather needs to maintain the deformation without irreversibly altering the mechanical, aesthetic and organoleptic features of the deformed material.

The manufacturing process of three-dimensional leather objects is defined in claim 1.

Additional features of the invention will be clearer from the following detailed description, which refers to a merely illustrative, not limiting embodiment, which is shown in the appended figures, wherein.

The manufacturing process of three-dimensional leather objects according to the invention comprises the provision of a piece of leather (1) with a flesh side (1*a*) and a grain side (1*b*). A hardener additive (2) is applied on the flesh side (1*a*) of the piece of leather, in such a way to be absorbed by the leather fibers without reaching the grain side (1*b*) of the piece of leather. The additive (2) applied on the piece of leather (1) undergoes a drying process (3) that can be performed in the fresh air for 20-30 minutes or in a drying chamber.

The additive (2) is a chemical compound that is activated at a temperature comprised between 30° C. and 50° C. The additive (2) comprises Thiophene, Sodium Dioctyl Sulphosuccinate, Alcohols, Fatty Alcohols (long-chain alcohols) C12-18 (even numbered) and Ethoxylates.

It must be considered that when the temperature increases, the elasticity and plasticity of leather generally increase and leather can be given the desired shape by uniformly distributing a pressure according to a specific geometry.

The addition of the additive (2) on the piece of leather (1) increases the homogeneous elasticity of the piece of leather (1) on every part of the geometric area where pressure is exerted.

The additive (2) must be homogeneously applied on the flesh side (1*a*) of the piece of leather. Spray-coating machines or roller coating machines can be used to apply the additive (2); otherwise, the additive (2) can be applied manually with a sponge or a roller. In order for the additive (2) to penetrate the piece of leather (1) with the correct depth, without getting the grain side (1*b*) of the piece of leather wet, an average dose of additive from 300 to 500 $g/m^2$ is used according to the features of the leather and the result to be obtained.

Figure 1:
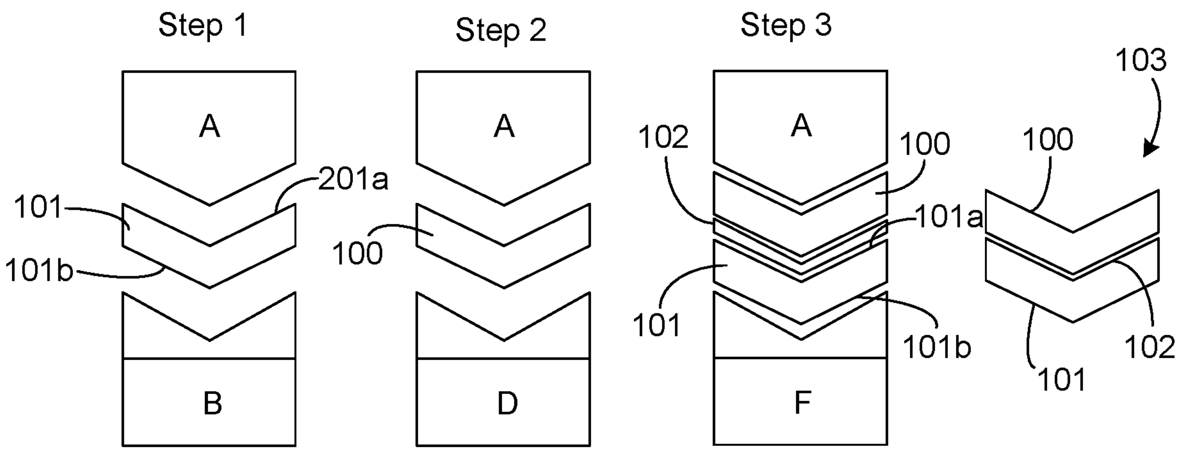
FIG. 1 PRIOR ART
FIG. 1 is a diagrammatic view of the steps of a manufacturing process of three-dimensional leather objects according to the prior art.
Figure 2:
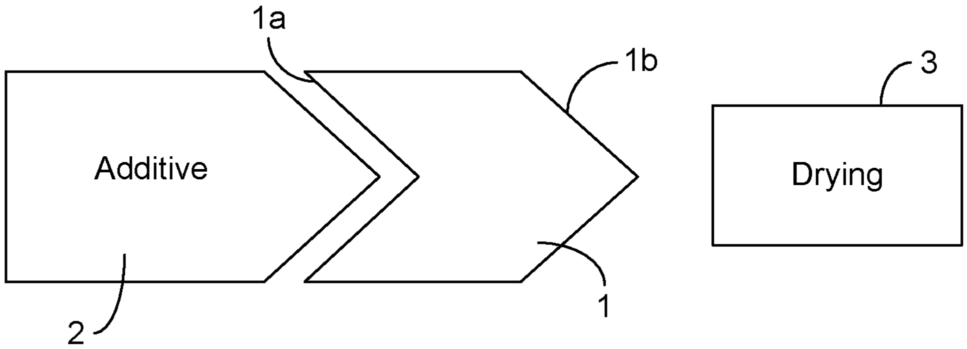
FIG. 2 is a diagrammatic view of a first step of the manufacturing process of three-dimensional leather objects according to the invention.
Figure 3:
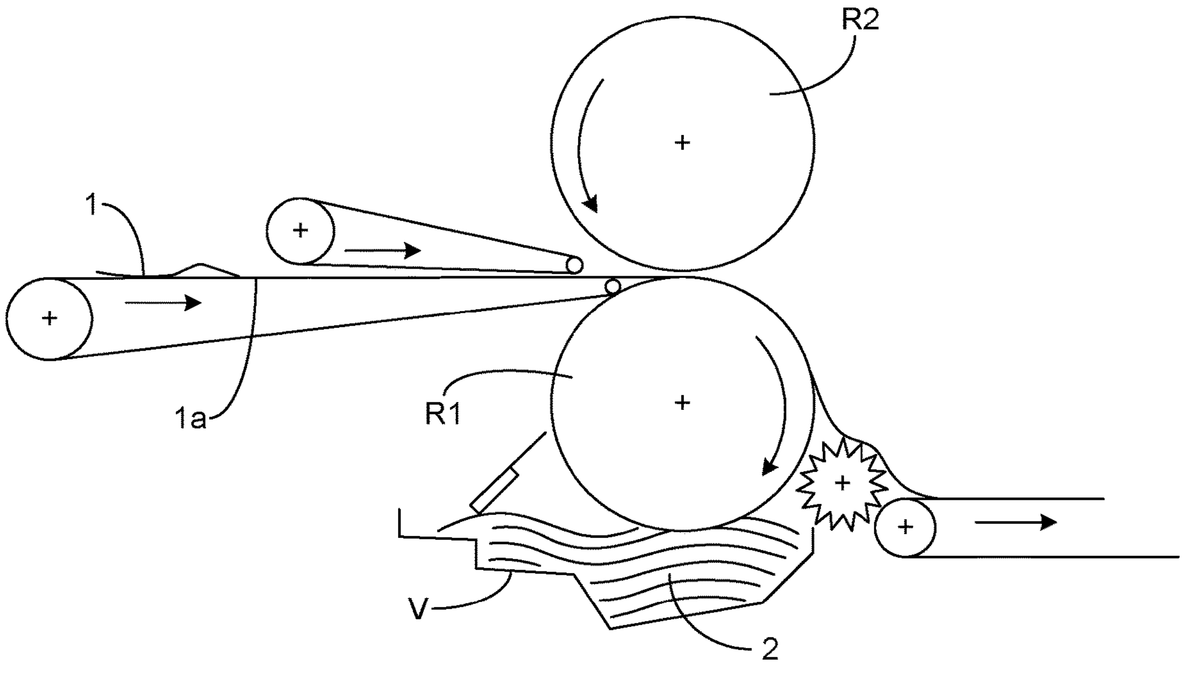
FIG. 3 is a diagrammatic view of a roller coating machine for the application of additive on a piece of leather.

FIG. 3 illustrates a roller coating machine, wherein the piece of leather (1) is fed between a first counter-rotating roller (R1) and a second counter-rotating roller (R2), and the flesh side (1*a*) of the piece of leather is directed towards the first roller (R1). The additive (2) contained in a tank (V) is used to get the first roller (R1) wet.

Figure 4:
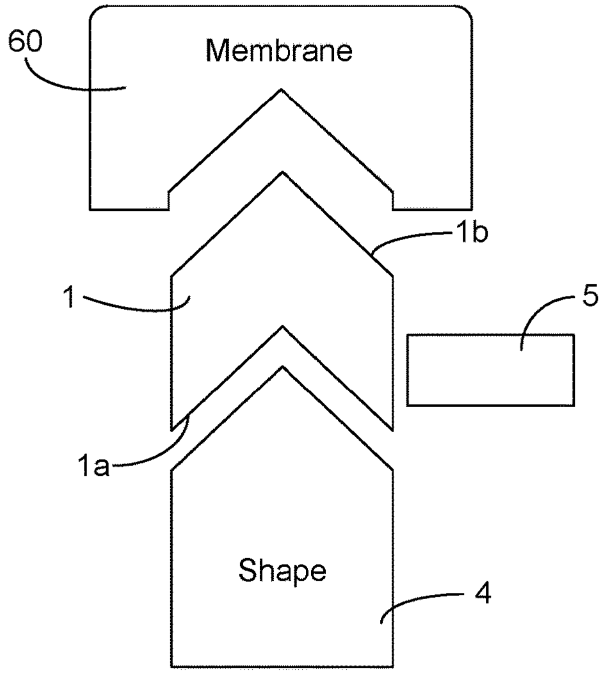
FIG. 4 is a diagrammatic view of a second step of the manufacturing process of three-dimensional leather objects according to the invention.

With reference to FIG. 4, when the piece of leather (1) is treated with the additive (2) and is completely dried, said piece of leather (1) is disposed on a forming shape (4), with the flesh side (1*a*) of the piece of leather disposed on the shape (4). The shape (4) can be selected according to the shape to be given to the piece of leather. Alternatively, the shape (4) can directly consist in a structure whereon the piece of leather is suitable for being glued in order to coat said structure with leather.

Tensioning and holding elements (5) can be applied in the areas with the highest level of deformation and stretching of the piece of leather (1) in order to copy concave and/or convex geometries of the shape (4) and avoid the formation of wrinkles and creases.

A membrane (60) is applied on the grain side (1*b*) of the piece of leather (1) in order to homogeneously exert a uniform pressure. The membrane (60) must be made of a soft, elastic material in such a way not to compress the grain side (1*b*) of the leather, without flattening and polishing the finishing of the grain side and maintaining the pattern of the original grain of the grain side (1*b*) of the piece of leather.

Figure 5:
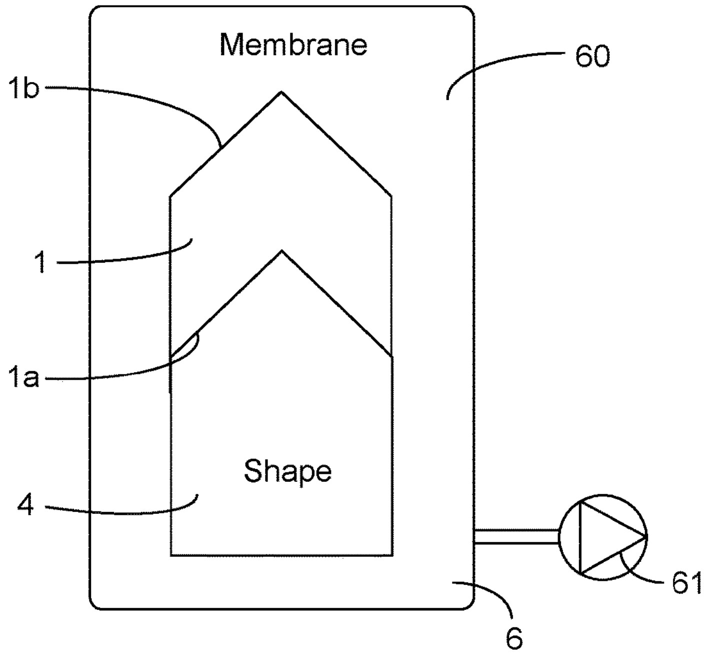
FIGS. 5 and 6 are diagrammatic views of the following steps of the manufacturing process of three-dimensional leather objects according to the invention.

With reference to FIG. 5, after the piece of leather (1) is disposed on the shape (4), the piece of leather (1) and the shape (4) are inserted in a vacuum sack (6) that generates the membrane (60) that is distributed on the grain side (1*b*) of the piece of leather. The vacuum sack (6) is hermetically closed and connected to a vacuum pump (61). Air is extracted from the vacuum sack (6) by means of the pump (61), in such a way that the flesh side (1*a*) of the piece of leather is in close contact with the shape (4), without compressing the piece of leather. In view of the above, the piece of leather and the shape (4) will not change their position during the following handling steps. A rough vacuum (RV) is applied during this step: $1\times10^5$ Pa-$1\times10_2$ Pa. The rough vacuum is sufficient to make the piece of leather adhere to the shape.

Figure 6:
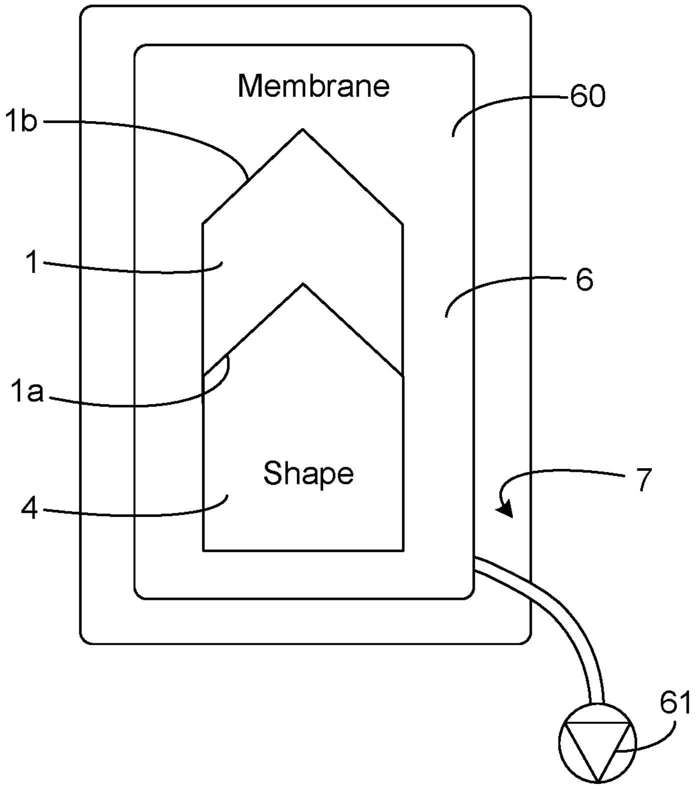

With reference to FIG. 6, the vacuum sack (6) with the shape (4) and the piece of leather (1) is inserted in a hot chamber (7) that is heated at a temperature of 40°–75° C. Such a hot chamber (7) may be ventilated. The vacuum sack (6) with the shape (4) and the piece of leather (1) remains in the hot chamber (7) for 3-10 minutes, according to the dimensions and thickness of the piece of leather (1) and of the shape (4), in such a way that the piece of leather reaches a uniform temperature of approximately 50° C. The additive (2) is activated at the temperature of 40°-50° and the deformability of the piece of leather increases.

It must be considered that the process according to the invention is performed at a low temperature (approximately 50°), i.e. at a temperature that is considerably lower than the temperature of the piece of leather (1) for the formation of the grain on the grain side (1*b*). Therefore, the leather is not significantly altered in the areas with the highest deformation and/or stretching, as it occurs in the hot forming process wherein leather is in contact with hard surfaces, such as the heated aluminum or steel surface of the half-mold.

Vacuum is applied to the vacuum sack (6) and air is extracted gradually by means of the vacuum pump (61), in such a way to progressively compress the piece of leather (1) on the shape (4) until the desired shape is achieved. In this step a high vacuum (HV) can be gradually achieved: $1\times10^{-1}$ Pa-$1\times10^{-5}$ Pa.

When the desired deformation of the piece of leather (1) is achieved, the vacuum sack (6) is extracted from the hot chamber, keeping the vacuum pressure in the vacuum sack (6).

The vacuum sack (6) with the shape (4) and the piece of leather (1) is cooled in the fresh air or in a ventilated environment until the piece of leather (1) reaches a temperature of 25° C. When the piece of leather reaches a temperature of 25° C., the vacuum sack (6) is opened and the shape (4) and the piece of leather (1) are extracted.

The use of the vacuum sack (6) permits to exert a homogeneous pressure on all the surfaces of the piece of leather (1), in any direction, without the limitation of the closing direction of the mold that occurs in the hot forming process according to the prior art. In view of the above, undercuts or reliefs can be copied also in the lateral sides of the shape (4), without using any lateral movement of the shape or any special automation.

Now the piece of leather (1) can be detached from the shape (4). The piece of leather (1) has taken the form of the shape (4) whereon it has been pressed, maintaining the geometry and the original elasticity and softness properties.

Figure 7:
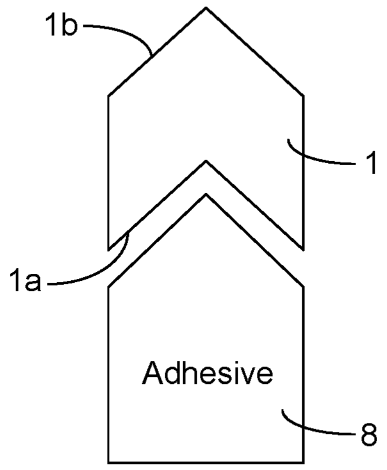
FIG. 7 is a diagrammatic view of a variant of the manufacturing process of three-dimensional leather objects according to the invention.

With reference to FIG. 7, according to a variant of the method of the invention, before disposing the piece of leather (1) on the shape (4), an adhesive (8) is applied on the flesh side (1*a*) of the piece of leather. Such a type of adhesive is an aqueous-based adhesive that is activated at a temperature higher than 70° C.

When the adhesive (8) is dry, the piece of leather (1) is disposed on the shape (4) and the shape (4) with the piece of leather (1) are disposed in the vacuum sack (6). Considering that the vacuum forming process occurs at a temperature of approximately 50° C. of the piece of leather, the adhesive (8) is not activated and therefore, when the process is finished, the piece of leather (1) can be detached from the shape (4) because adhesion was not obtained. When the piece of leather (1) must be fixed to a supporting structure, it will be simply necessary to heat such a piece of leather at a temperature equal to the activation temperature of the adhesive (8) in such a way that the piece of leather is adhered on the supporting structure.

Figure 8:
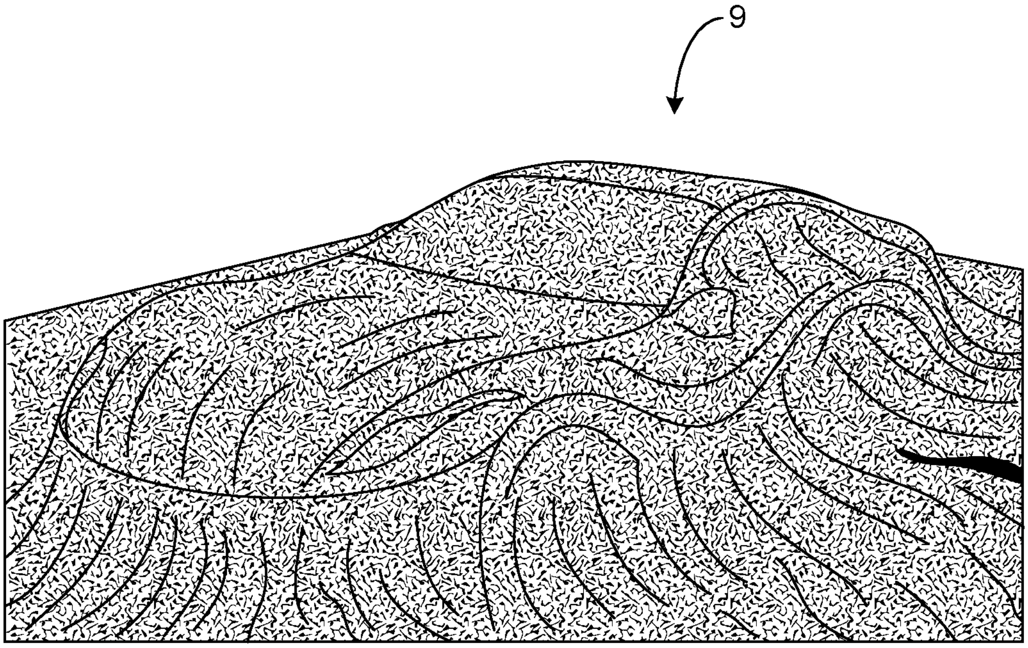
FIG. 8 illustrates a three-dimensional leather object obtained with the process of the present inventon.

For illustrative purposes, FIG. 8 illustrates a three-dimensional leather object (9) obtained with the process of the invention.

As clearly shown in FIG. 8, the grain of the grain side of the leather is unaltered; moreover, several recessed or undercut lateral parts of the three-dimensional leather object (9), which cannot be obtained with a hot forming process, are obtained.

The invention claimed is:

1. A process for manufacturing a three-dimensional leather object, the process comprising:

providing a piece of leather, the piece of leather having a flesh side and a grain side;

applying a hardener additive onto the flesh side of the piece of leather, wherein the hardener additive is activated at an activation temperature of approximately 40° C. to 50° C., wherein the hardener additive comprises thiophene, sodium diocytl sulphosuccinate, alcohols, fatty alcohols C12-C18 that are even numbered and ethoxylates;

drying the hardener additive;

providing a shape matching a shape of the three-dimensional leather object;

positioning the flesh side of the piece of leather on the provided shape;

introducing the shape of the piece of leather inside a vacuum sack such that the vacuum sack generates a membrane applied on the grain side of the piece of leather;

applying a rough vacuum in the vacuum sack such that the flesh side of the piece of leather adheres onto the shape;

heating the vacuum sack with the shape and the piece of leather until the piece of leather reaches the activation temperature of the hardener additive;

applying the vacuum progressively during the step of heating so as to progressively compress the piece of leather onto the shape until a desired shape is obtained;

cooling the vacuum sack with the shape and the piece of leather until the piece of leather reaches a temperature of approximately 25° C. under vacuum conditions;

extracting the shape with the piece of leather from the vacuum sack; and removing the piece of leather from the shape such that the piece of leather has a shape of the three-dimensional leather object.

2. The process of claim 1, wherein the hardener additive is applied on the flesh side of the piece of leather so as to be absorbed by leather fibers without the hardener additive reaching the grain side of the piece of leather.

3. The process of claim 2, wherein the hardener additive has an average dosage of between 300 $g/m^2$ and 500 $g/m^2$.

4. The process of claim 1, further comprising:

applying tensioning and holding elements in an area of the piece of leather that has a highest level of deformation; and stretching the piece of leather so as to copy a concave geometry or a convex geometry of the shape.

5. The process of claim 1, wherein the step of heating comprises:

positioning the vacuum sack with the shape and the piece of leather in a hot chamber, the hot chamber being heated to a temperature of 40° C. to 75° C. for between three minutes and ten minutes.

6. The process of claim 1, wherein the step of applying vacuum progressively is carried out inside the vacuum sack.

7. The process of claim 1, further comprising:

applying an adhesive onto the flesh side of the piece of leather before the step of drying the hardener additive and before the step of positioning the flesh side of the piece of leather onto the shape, the adhesive having an activation temperature greater than 70° C. so as to not activate during the step of heating the vacuum sack with the shape and the piece of leather.

8. The process of claim 1, wherein the step of drying the hardener additive is performed in fresh air.

9. The process of claim 1, wherein the step of drying the hardener additive is performed in a ventilated chamber.

10. The process of claim 1, wherein the step of cooling is performed in fresh air.

11. The process of claim 1, wherein the step of cooling is performed in a climatic chamber.

* * * * *